US012283133B2

(12) United States Patent
Schartau et al.

(10) Patent No.: US 12,283,133 B2
(45) Date of Patent: *Apr. 22, 2025

(54) VEHICLE POSITION VALIDATION

(71) Applicant: EYGS LLP, London (GB)

(72) Inventors: Philipp Schartau, London (GB); John Simlett, London (GB)

(73) Assignee: EYGS LLP, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/611,972

(22) Filed: Mar. 21, 2024

(65) Prior Publication Data

US 2024/0273953 A1  Aug. 15, 2024

Related U.S. Application Data

(63) Continuation of application No. 17/598,014, filed as application No. PCT/GB2020/050816 on Mar. 26, 2020, now Pat. No. 12,073,657.

(30) Foreign Application Priority Data

Mar. 26, 2019 (GB) ..................... 1904165

(51) Int. Cl.
*G07B 15/00* (2011.01)
*G01C 21/28* (2006.01)
(Continued)

(52) U.S. Cl.
CPC ........... *G07B 15/063* (2013.01); *G01C 21/28* (2013.01); *G01S 19/14* (2013.01); *G01S 19/396* (2019.08);
(Continued)

(58) Field of Classification Search
CPC ....... G07B 15/063; G06T 7/70; G01S 19/396; G01S 19/14; G01S 5/0295; G06V 20/54; G01C 21/28
(Continued)

(56) References Cited

U.S. PATENT DOCUMENTS

2010/0287038 A1  11/2010  Copejans
2012/0053888 A1   3/2012  Stahlin
(Continued)

FOREIGN PATENT DOCUMENTS

CN  106228799 B  5/2019
EP    2176836 B1  5/2019
(Continued)

OTHER PUBLICATIONS

GB Search Report under Section 17(6) received for GB Application 1904165.6 dated Sep. 10, 2019. 3 pages.
(Continued)

*Primary Examiner* — Tiffany P Young
(74) *Attorney, Agent, or Firm* — Finch & Maloney PLLC

(57) ABSTRACT

A method for validating a current position of a first vehicle, the method comprising: receiving position data from the first vehicle, the position data providing the current position of the first vehicle; receiving position validation data associated with the first vehicle, the position validation data being generated by a source distinct from the first vehicle; and validating the current position of the first vehicle provided by the position data against the position validation data to determine an accuracy value for the current position.

20 Claims, 3 Drawing Sheets

(51) Int. Cl.
*G01S 19/14* (2010.01)
*G01S 19/39* (2010.01)
*G06T 7/00* (2017.01)
*G06T 7/70* (2017.01)
*G06V 20/54* (2022.01)
*G07B 15/06* (2011.01)
*G01S 5/02* (2010.01)

(52) U.S. Cl.
CPC ............... *G06T 7/70* (2017.01); *G06V 20/54* (2022.01); *G01S 5/0295* (2020.05)

(58) Field of Classification Search
USPC .......................................................... 701/495

See application file for complete search history.

(56) References Cited

U.S. PATENT DOCUMENTS

| | | | |
|---|---|---|---|
| 2017/0090036 A1 | 3/2017 | Zalewski et al. | |
| 2018/0262694 A1* | 9/2018 | Lee ....................... | H04W 48/10 |
| 2020/0331499 A1 | 10/2020 | Watanabe et al. | |
| 2022/0073084 A1* | 3/2022 | Sakai ................. | B62D 15/0285 |
| 2022/0130177 A1 | 4/2022 | Schartau et al. | |

FOREIGN PATENT DOCUMENTS

| | | |
|---|---|---|
| WO | 199840759 A1 | 9/1998 |
| WO | 2009090515 A2 | 12/2008 |
| WO | 2009015989 A1 | 2/2009 |

OTHER PUBLICATIONS

International Search Report and Written Opinion received for PCT Application PCT/GB2020/050816 Mailed Jun. 15, 2020. 15 pages.

* cited by examiner

VEHICLE POSITION VALIDATION

CROSS-REFERENCE TO RELATED APPLICATIONS

This application is a continuation of U.S. patent application Ser. No. 17/598,014, filed Sep. 24, 2021, which claims priority under 35 U.S.C. § 371 as a national stage application of PCT Application No. PCT/GB2020/050816, filed Mar. 26, 2020, which claims priority to GB 1904165.6, filed Mar. 26, 2019, each of which is hereby incorporated herein by reference in its entirety.

This invention relates to a method for validating a current position of a vehicle and a vehicle monitoring device configured to validate a current position of a vehicle.

At present, most automobiles are privately owned and used exclusively by the owners. For much of the time, these vehicles are unused. There are some limited opportunities to share the usage of automobiles: for example, taxis, chare share arrangements and car hire companies. These schemes increase the proportion of time for which an individual vehicle is used, which can reduce overall costs to the users. It is anticipated that in the future there will be increased demand for shared vehicle usage schemes, especially in urban areas.

The vehicles are assets to their actual owners and so it is important that the location of those vehicles be tracked so that the owners know where the vehicle is. In addition, a user of the vehicle may be charged for the use of the vehicle in dependence on the distance that the vehicle is driven.

A vehicles position can be tracked by fitting the vehicle with a positioning unit that can derive the current position of the vehicle and then configuring the vehicle so that it can send position data that provides the current position of the vehicle over time to a monitoring device. The monitoring device can then log the current position of the vehicle over time so that it can be accessed for a variety of uses, such as billing and asset monitoring as detailed above. The positioning unit may receive signals from one or more global positioning systems to determine the current position of the vehicle.

There are ways in which the position data provided by the positioning unit can be manipulated so that the positioning unit does not calculate the correct data. This can be used to manipulate where the monitoring device thinks the vehicle actually is and/or how far the vehicle has travelled during a trip. As the vehicle owner is not in contact with the vehicle when it is being shared, it can be difficult to know whether the positioning unit has been supplying the correct data concerning the current position of the vehicle or not.

It would therefore be desirable for there to be a way of determining if the current position supplied by the vehicle is accurate.

According to a first aspect of the present invention there is provided A method for validating a current position of a first vehicle, the method comprising: receiving position data from the first vehicle, the position data providing the current position of the first vehicle; receiving position validation data associated with the first vehicle, the position validation data being generated by a source distinct from the first vehicle; and validating the current position of the first vehicle provided by the position data against the position validation data to determine an accuracy value for the current position.

The position validation data may be generated by a second vehicle. The position validation data may be generated by a monitoring unit. The monitoring unit may be a camera.

The position data may comprise time series data providing the current position of the first vehicle over time. The position validation data may provide information regarding the position of the first vehicle as obtained by the source distinct from the first vehicle.

The position validation data may comprise a detected position of the first vehicle. The position validation data may comprise the time at which the first vehicle was at the detected position. Validating the current position of the first vehicle may comprise comparing the current position provided by the position data to the detected position of the first vehicle.

The position validation data may comprise at least one image of the first vehicle and the method may further comprise deriving a unique identifier for the first vehicle from the image(s). The position validation data may comprise a unique identifier for the first vehicle.

The position validation data may comprise a deviation from an expected motion path for a second vehicle. Validating the current position of the first vehicle may comprise comparing the deviation from a known motion path for a second vehicle to a motion path for the first vehicle derived from the position data. The accuracy value may be a binary determination of whether the current position is accurate or not accurate.

Validating the current position of the first vehicle provided by the position data against the position validation data to determine an accuracy value may comprise deriving a position for the first vehicle from the position validation data Validating the current position of the first vehicle provided by the position data against the position validation data to determine an accuracy value may comprise comparing the distance between the current position and the position derived from the position validation against a threshold value, and if the distance is less than the threshold value determining that the current position is accurate. The accuracy value may indicate how far the current position is from the position derived from the position validation data.

According to a second aspect of the present invention there is provided a vehicle monitoring device being configured to: receive position data from a first vehicle, the position data providing a current position of the first vehicle; receive position validation data associated with the first vehicle, the position validation data being generated by a source distinct from the first vehicle; and validate the current position of the first vehicle provided by the position data against the position validation data to determine an accuracy value for the current position.

The present invention will now be described by way of example with reference to the accompanying drawings. In the drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for validating a current position of a first vehicle. The method comprises receiving position data from the first vehicle, the position data providing the current position of the vehicle. The method further comprises receiving position validation data associated with the first vehicle, the position validation data being generated by a source distinct from the first vehicle. The position validation data may be received from the source distinct from the first vehicle. The method further comprises validating the current position of the first vehicle provided by the position data against the position validation data to determine an accuracy value for the current position. The source distinct from the first vehicle may be a second vehicle and/or a monitoring unit. The present invention also relates to a vehicle monitoring device that can implement the methods described herein.

Figure 1:
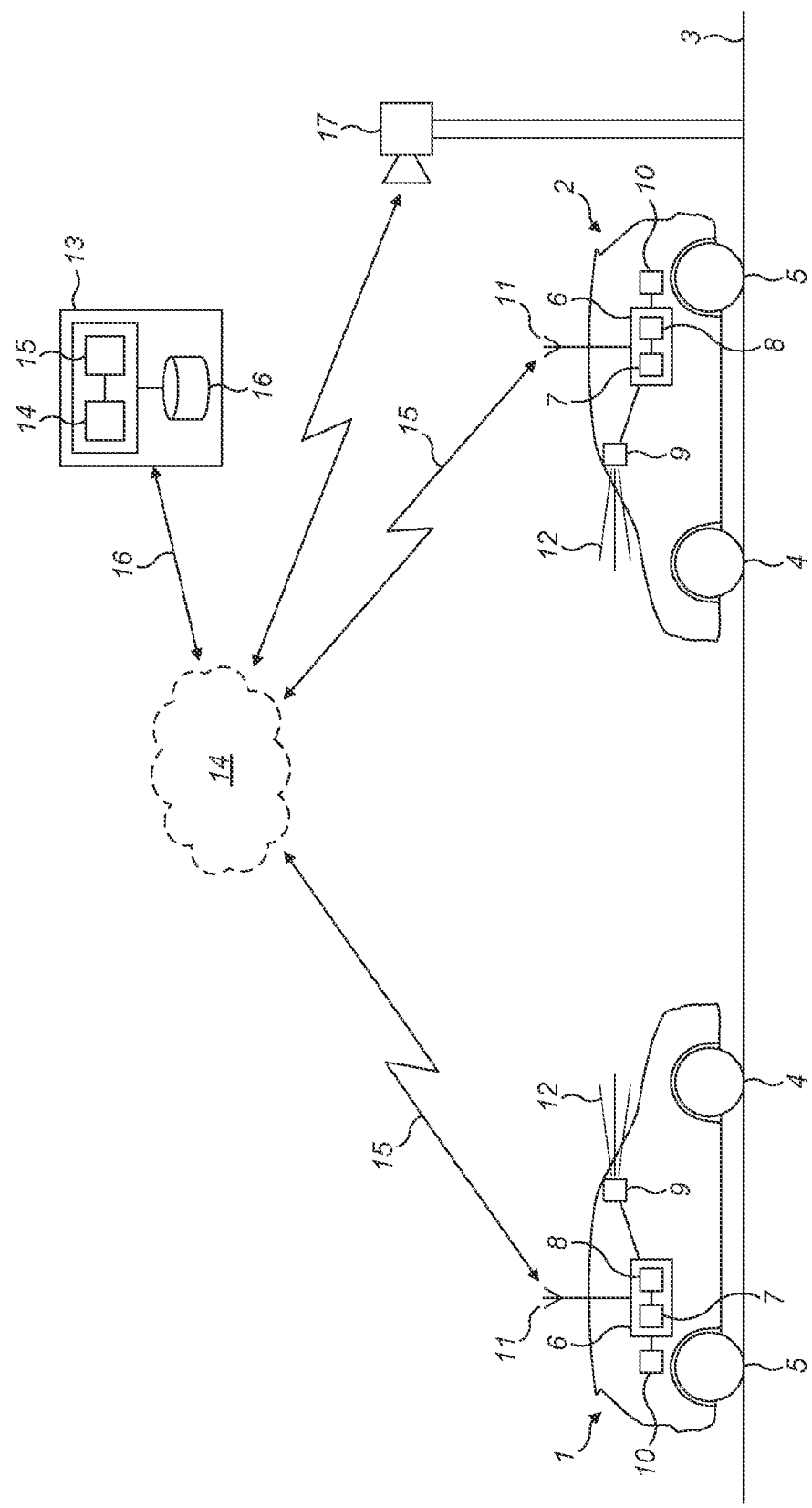
FIG. 1 shows a schematic diagram of vehicles being monitored by a monitoring unit.

FIG. 1 shows a schematic diagram of a first vehicle 1 and a second vehicle 2 on a road 3. The vehicles may be automobiles. The vehicles may be cars. The vehicles may be road vehicles. The vehicles may be commercial vehicles such as vans, lorries or agricultural machinery. The vehicles comprise front wheels 4 and rear wheels 5. The first and second vehicles 1, 2 are supported on the road 3 by the wheels 4, 5.

The vehicles comprise a vehicle control unit 6. The vehicle control unit 6 may comprise a processor 7 and a non-volatile memory 8. The vehicle control unit 6 may be formed of many control units, for instance an engine control unit and a gearbox control unit, therefore the vehicle control unit 6 may comprise more than one processor and more than one memory. The memory stores a set of program instructions that are executable by the processor, and reference data such as look-up tables that can be referenced by the processor in response to those instructions. The processor maybe configured to operate in accordance with a computer program stored in non-transitory form on a machine readable storage medium. The computer program may store instructions for causing the processor to perform the vehicle operations in the manner described herein. For instance, the vehicles can comprise an exterior imaging system 9, such as a LIDAR system or a camera system, that can detect objects external to the vehicle and the vehicle control system 6 may control the operation of the exterior imaging system 9. The exterior imaging system may emit radiation 12 which scatters off of objects. The back scattered radiation is collected by the exterior imaging system 9 to determine the range and/or kind of object that is within the detection range of the exterior imaging system. The exterior imaging system 9 may be capable of receiving radiation emitted by another vehicle's exterior imaging system 9 and processing that radiation as described herein. Alternatively, the exterior imaging system may receive radiation, for example using a camera to capture visible light, and detect objects based on the captured pictures.

The vehicles also comprise a positioning unit 10 configured to generate position data associated with the current position of the vehicle. The positioning unit 10 may be configured to receive data from at least one satellite that emits a positioning signal. The global navigation satellite systems that the satellites are part of may be any satellite navigation system such as GPS, GLONASS, Galileo or a combination of systems. The positioning unit 10 can use the received data to calculate the current position of the vehicle 1, 2. The positioning unit 10 may be connected to an antenna to receive the positioning signals. Although the positioning unit 10 is pictured as a separate unit it may be partly or fully formed within the vehicle control unit 6. The positioning unit 10 may also calculate the current position of the vehicle using data associated with the vehicle. For instance, using proximity to cellular base stations, proximity to Wi-Fi base stations, number of wheel revolutions and/or position of the steering wheels.

The vehicle control unit 6 may also comprise one or more transceivers for sending and receiving data between the vehicle and an external network. The transceiver(s) are connected to one or more antennas 11. The vehicle control unit 6 is configured to communicate data between the vehicle 1, 2 and a vehicle monitoring device 13. The vehicle control unit 6 and the vehicle monitoring device 13 may both be connected to an external network 14 such as the internet. The vehicle control unit 6 may communicate with the external network 14 as shown by 15. The vehicle monitoring device 13 may communicate with the external network 14 as shown by 16. The communication route between the vehicle control unit 6 and the vehicle monitoring device 13 may be via a mixture of wireless and wired communication links. The vehicle monitoring device 13 can therefore receive position data from a vehicle where the position data provides the current location of the vehicle. The position data can be time series data that provides the current location of the vehicle over time.

The vehicle monitoring device 13 can also receive position validation data associated with that particular vehicle. This position validation data can be used to validate the current position of the vehicle provided by the position data. The position validation data can come from a variety of sources. The position validation data is generated when particular events occur associated with the detection of the first vehicle. The position validation data provides information regarding the position of the first vehicle 1 as obtained by another entity such as a second vehicle 2 or a monitoring unit 17. For example:

When a first vehicle 1 that is providing position data is detected by a second vehicle 2 this may trigger the second vehicle 2 to generate position validation data for the first vehicle. This detection may be via the second vehicle's exterior imaging system 9. The exterior imaging system 9 may take a picture, a series of pictures, or a video of the first vehicle from which a unique identifier of that first vehicle can be determined. This unique identifier may be the registration number of the vehicle. The unique identifier may be a combination of characteristics associated with the vehicle, for instance the registration number, the make of car, paint colour, and/or shape or model of the vehicle. The second vehicle 2 may derive the unique identifier itself or alternatively may send the picture(s) or video to the vehicle monitoring device 13 for processing. In either situation, the second vehicle may generate and send position validation data associated with the first vehicle 1 to the vehicle monitoring device 13. If the exterior imaging system 9 of the first vehicle 1 emits radiation, such as in a LIDAR system, then the second vehicle 2 may receive that radiation. The radiation emitted by the first vehicle 1 may be encoded so that when the first vehicle 1 receives backscattered radiation it can be sure that the radiation it processes was emitted by the first vehicle 1 and not another vehicle. The encoding of the radiation may be a unique identifier of the first vehicle. For instance, the vehicle identification number (VIN) may be encoded into the radiation. The second vehicle may receive this encoded radiation and thus detect that the first vehicle is nearby. The second vehicle may therefore generate and send position validation data associated with the first vehicle 1 to the vehicle monitoring device 13. The second vehicle 2 may also send the current position of the second vehicle when the first vehicle was detected and/or the detected position of the first vehicle when the first vehicle was detected. These may amount to roughly to the same position.

When the first vehicle 1 is detected by a monitoring unit 17 this may trigger the monitoring unit 17 to generate position validation data associated with the first vehicle 1. The monitoring unit 17 may be a camera configured to take pictures and/or videos of a particular area. The monitoring unit 17 may be part of a closed circuit television (CCTV) system. The position of the monitoring unit 17 is known and so the general position of the first vehicle 1 when passing through the particular area will also be known. The position of the monitoring unit 17 may be fixed. When the first vehicle 1 passes through that particular area, the monitoring unit 17 is configured to generate position validation data associated with the first vehicle 1 and send that position validation data to the monitoring unit 17.

Figure 2:
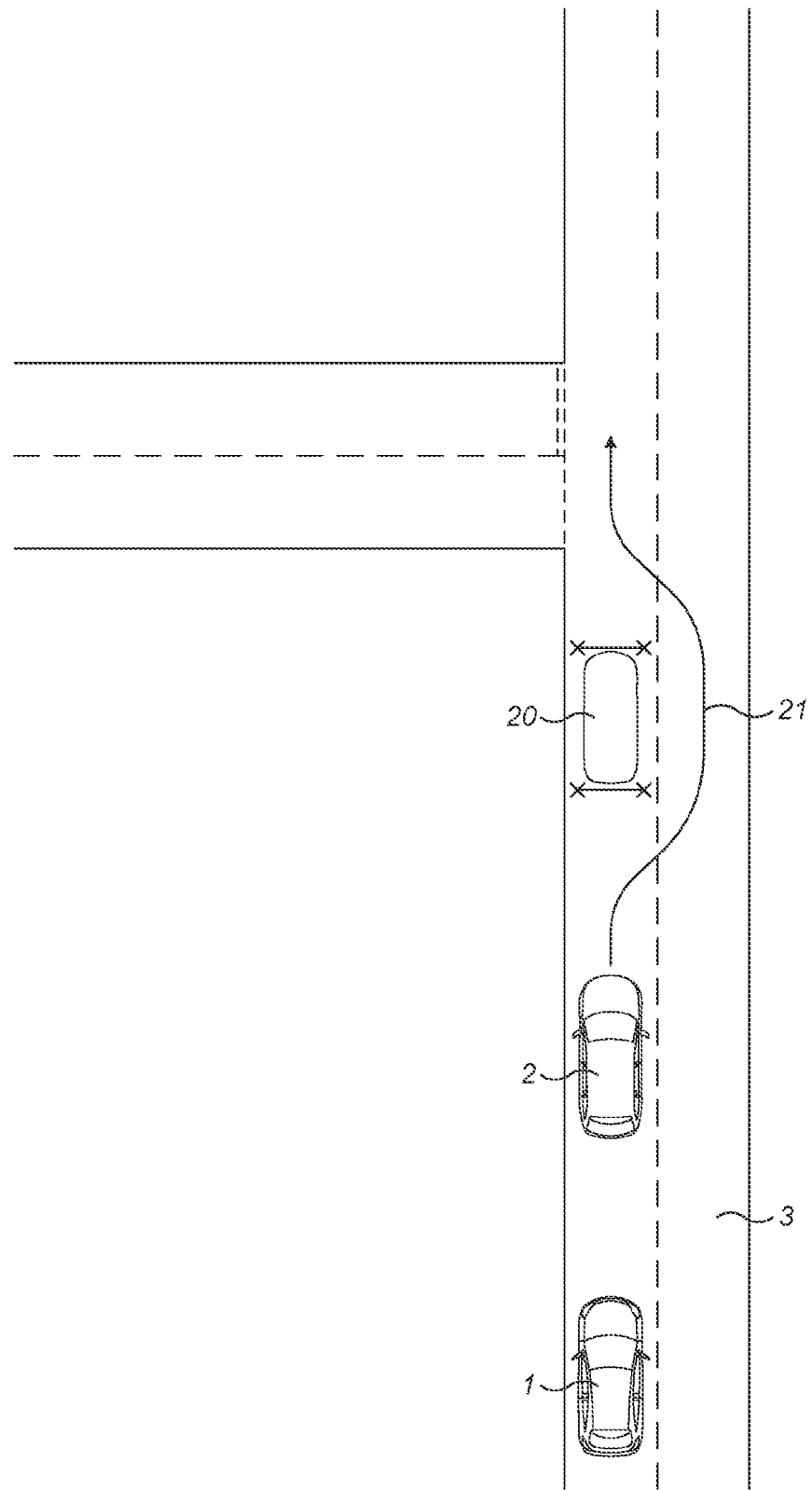
FIG. 2 shows a plan view of a road with vehicles avoiding an obstacle.

The first vehicle 1 may follow a motion path. The first vehicle 1 may be required to deviate from an expected motion path due to obstacles present along the expected motion path. Thus, the first vehicle 1 may make ad hoc movements that are common with other vehicles that move along the same motion path at similar times. As shown in FIG. 2, the first vehicle 1 may follow a motion path on road 3. There may be an obstacle 20 in the road 3. For instance, this may be roadworks or a parked vehicle. The other vehicles, such as second vehicle 2, may supply position data to vehicle monitoring device 13. This position data may be used as position validation data. The position data may provide time series data showing the current position of the vehicle. This can be used to derive the current motion path 21 for the second vehicle 2 and the vehicle monitoring device 13 can then assess where the current motion path deviates from an expected motion path of the second vehicle 2. When first vehicle 1 moves along the same motion path, for example after second vehicle 2, the first vehicle 1 is likely to deviate from the expected motion path of vehicle 1 at a similar position to second vehicle. Therefore, the vehicle monitoring device 13 can determine whether the position data received from first vehicle 1 is accurate because it should deviate from the expected motion path at the same place as second vehicle 2 did.

The vehicle management device 13 may comprise a processor 14 and a non-volatile memory 15. The vehicle management device 13 may comprise more than one processor and more than one memory. The memory stores a set of program instructions that are executable by the processor, and reference data such as look-up tables that can be referenced by the processor in response to those instructions. The processor maybe configured to operate in accordance with a computer program stored in non-transitory form on a machine readable storage medium. The computer program may store instructions for causing the processor to perform the monitoring methods in the manner described herein. The vehicle management device 13 may comprise a data store 16 configured to store information derived during the monitoring methods described herein. For instance, the validated location of the vehicles at given times.

Figure 3:
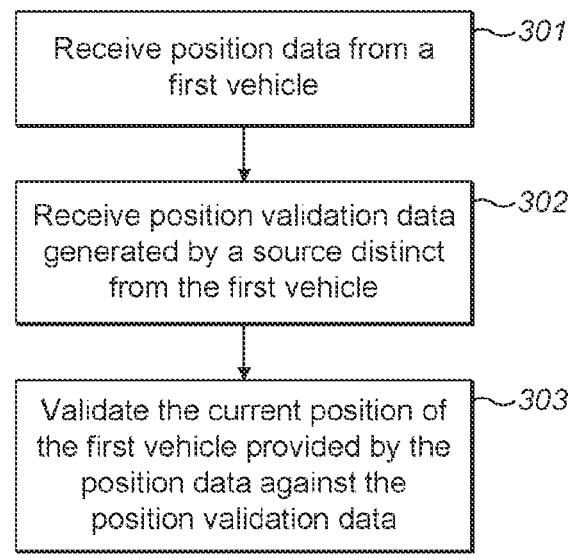
FIG. 3 shows a flow diagram of a method for validating a current position of a vehicle.

The method by which vehicle management device 13 validates a current position of a vehicle will now be described with reference to FIG. 3.

As shown in step 301, the vehicle management device 13 receives position data from a first vehicle 1. As described herein, the position data provides the current position of the first vehicle 1. The position data may provide time series data of the current position of the first vehicle 1 over time.

As shown in step 302, the vehicle management device 13 receives position validation data associated with the first vehicle. As described herein, the position validation data is generated by a source distinct from the first vehicle 1. The vehicle management device 13 receives the position validation data from a source distinct from the first vehicle 1. The position validation data may be generated by a second vehicle 2 and/or a monitoring unit 17. The position validation data may comprise a position at which the first vehicle 1 was identified. The position validation data may comprise a time at which the first vehicle 1 was identified. The position validation data may comprise an identifier for the first vehicle 1. The position validation data may provide a picture or video of the first vehicle 1 and a time at which the picture or video was taken. The vehicle management device 13 may then derive the identifier for the first vehicle 1 from the picture or video of the first vehicle 1. As described herein, the first vehicle 1 may be identified by a picture or video. Alternatively, the first vehicle 1 may be identified by receiving encoded radiation emitted by the first vehicle. This encoded radiation may be in the form of a LIDAR signal. The position validation data may comprise a deviation from an expected motion path as recorded by a second vehicle 2.

As shown in step 303, the vehicle management device 13 validates the current position of the first vehicle 1 provided by the position data against the position validation data. The vehicle management device 13 determines an accuracy value for the current position of the first vehicle 1 provided by the position data. The accuracy value may be a binary determination of whether the current position is accurate or not accurate. This may use a threshold value for how far the current position is from the position derived from the position validation data to determine whether the current position is accurate or not accurate. Alternatively, the accuracy value may be a score associated with how close the current position is to the position derived from the position validation data. The accuracy value may indicate how far the current position, as supplied by the position data, is from the position derived from the position validation data.

In the case that the position validation data provides a position and time at which the first vehicle 1 was identified, the validation of the current position of the vehicle provided by the position data may simply require a comparison between the two positions as recorded at the same time. In the case that the position validation data provides a deviation from an expected motion path, the validation may comprise a comparison between time series data for the current position as provided by the position data and the time series data provided by the position validation data to determine if the deviation from the expected motion path occurred in the motion path of the first vehicle 1 in the same position as that for the second vehicle 2.

Using the methods described herein, a vehicle management device 13 can therefore determine whether the position data provided by a first vehicle 1 is accurate. This is advantageous because it means that it is less likely that the position data provided by the first vehicle 1 can be tampered with. This means that the security of the asset that is the first vehicle is increased meaning there is less risk to its owner when the vehicle is used in a shared vehicle scheme.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for validating a current position of a first vehicle, the method comprising:
    receiving, at a vehicle monitoring device, a position data signal from the first vehicle, the position data signal providing the current position of the first vehicle;
    detecting the first vehicle by a source distinct from the first vehicle;
    in response to the first vehicle being detected by the source distinct from the first vehicle, receiving, at the vehicle monitoring device, a position validation data signal associated with the first vehicle from the source distinct from the first vehicle; and
    validating, by the vehicle monitoring device, the current position of the first vehicle provided by the position data signal against the position validation data signal to determine an accuracy value for the current position.

2. The method according to claim 1, wherein the position validation data signal is generated by a second vehicle.

3. The method according to claim 1, wherein the position validation data signal is generated by a monitoring unit.

4. The method according to claim 3, wherein the monitoring unit is a camera.

5. The method according to claim 1, wherein the position data signal comprises time series data providing the current position of the first vehicle over time.

6. The method according to claim 1, wherein the position validation data signal comprises a detected position of the first vehicle.

7. The method according to claim 6, wherein the position validation data signal comprises a time at which the first vehicle was at the detected position.

8. The method according to claim 6, wherein validating the current position of the first vehicle comprises comparing the current position provided by the position data signal to the detected position of the first vehicle.

9. The method according to claim 1, wherein the position validation data signal comprises at least one image of the first vehicle and the method further comprises deriving a unique identifier for the first vehicle from the at least one image.

10. The method according to claim 1, wherein the position validation data signal comprises a unique identifier for the first vehicle.

11. The method according to claim 1, wherein the position validation data signal comprises a deviation from an expected motion path for a second vehicle.

12. The method according to claim 11, wherein validating the current position of the first vehicle comprises comparing the deviation from a known motion path for the second vehicle to a motion path for the first vehicle derived from the position data signal.

13. The method according to claim 1, wherein the accuracy value is a binary determination of whether the current position is accurate or not accurate.

14. The method according to claim 1, wherein validating the current position of the first vehicle provided by the position data signal against the position validation data signal to determine the accuracy value comprises deriving a position for the first vehicle from the position validation data signal.

15. The method according to claim 14, wherein validating the current position of the first vehicle provided by the position data signal against the position validation data signal to determine the accuracy value comprises comparing a distance between the current position and the position derived from the position validation data signal against a threshold value, and if the distance is less than the threshold value determining that the current position is accurate.

16. The method according to claim 14, wherein the accuracy value indicates how far the current position is from the position derived from the position validation data signal.

17. The method according to claim 1, wherein validating the current position of the first vehicle provided by the position data signal against the position validation data signal to determine the accuracy value comprises determining whether the first vehicle has deviated from an expected motion path.

18. A vehicle monitoring system comprising a vehicle monitoring device, a first vehicle, and a source distinct from the first vehicle, the vehicle monitoring system being configured to:
    receive, at the vehicle monitoring device, a position data signal from the first vehicle, the position data signal providing a current position of the first vehicle;
    detect the first vehicle by a source distinct from the first vehicle;
    in response to the first vehicle being detected by the source distinct from the first vehicle, receive, at the vehicle monitoring device, a position validation data signal associated with the first vehicle from the source distinct from the first vehicle; and
    validate, by the vehicle monitoring device, the current position of the first vehicle provided by the position data signal against the position validation data signal to determine an accuracy value for the current position.

19. A method for validating a current position of a first vehicle, the method comprising:
    receiving, at a vehicle monitoring device, a position data signal from the first vehicle, the position data signal providing the current position of the first vehicle;
    detecting the first vehicle by a source distinct from the first vehicle;
    in response to the first vehicle being detected by the source distinct from the first vehicle, receiving, at the vehicle monitoring device, a position validation data signal associated with the first vehicle from the source distinct from the first vehicle; and
    validating, by the vehicle monitoring device, the current position of the first vehicle provided by the position data against the position validation data to determine an accuracy value for the current position;
    wherein the source distinct from the first vehicle is another entity remote from the first vehicle.

20. The method according to claim 19, wherein the position validation data signal comprises at least one image of the first vehicle and the method further comprises deriving a unique identifier for the first vehicle from the at least one image.

\* \* \* \* \*